United States Patent [19]

Vindez

[11] Patent Number: 4,668,134

[45] Date of Patent: May 26, 1987

[54] APPARATUS FOR ORIENTATION OF TOOL ON WORKPIECE

[75] Inventor: Pierre G. Vindez, Redondo Beach, Calif.

[73] Assignee: P. V. Tool, Inc., Gardena, Calif.

[21] Appl. No.: 817,900

[22] Filed: Jan. 13, 1986

[51] Int. Cl.⁴ .............................................. B23B 45/04
[52] U.S. Cl. .................................... 408/97; 408/72 B; 408/130; 408/241 B; 74/813 L
[58] Field of Search .................. 408/241 B, 1 R, 137, 408/141, 10, 11, 13, 14, 102, 72 B; 74/813 L; 173/19, 32, 154; 10/136 R

[56] References Cited

U.S. PATENT DOCUMENTS 1,923,440  8/1933  Hunt et al. .................... 74/813 L X
4,588,334  5/1986  Khurana ........................ 408/241 G

*Primary Examiner*—Z. R. Bilinsky
*Attorney, Agent, or Firm*—Freilich, Hornbaker, Rosen & Fernandez

[57] ABSTRACT

A turret coupling (13) for locking a tool (10) in a desired angular position relative to a workpiece (16), where the tool is locked onto the workpiece by a fixture (19) through a nose piece (12), is comprised of a sleeve (13a) notched on the rim. The sleeve is closely fitted over the lower end of the tool, or a nose adapter (25), and held by a retainer (13b) threaded into the tool or the adapter. A latch key (24) locks the tool to the sleeve. To reposition the tool relative to the nose piece, a shaft (28) is lifted by a lever (26) having a return spring (22) under a button (21).

4 Claims, 5 Drawing Figures

APPARATUS FOR ORIENTATION OF TOOL ON WORKPIECE

BACKGROUND OF THE INVENTION

This invention relates to apparatus for orienting a tool on a workpiece, and more particularly to a positive feed drill secured to a workpiece for drilling a hole in situ, such as in the attachment of wings to an aircraft fuselage.

In virtually all motor driven tools, the motor and drive gear train of the tool occupy space that extends radially in one direction. This sometimes makes it difficult to position the tool on the workpiece. For example, in drilling holes for the attachment of wings to an aircraft fuselage, a fixture is secured over the area on which the holes are to be drilled, and the drill is then secured to the fixture at each hole position by a device commonly referred to as a "nose piece." It is sometimes necessary to reorient the tool with its motor relative to the nose piece secured to the fixture in order to accommodate the motor, such as when drilling holes in the aircraft wing very close to the fuselage. Accordingly, an object of this invention is to provide a device for "clocking" the tool, i.e., reorienting the tool relative to the nose piece by rotating it on the axis of the nose piece, and locking it in its new position.

SUMMARY OF THE INVENTION

In accordance with the present invention, a positive feed drill or similar tool that requires angular orientation about an axis perpendicular to a workpiece, and that is to be locked in the desired position for operation, is secured to the workpiece by a nose piece that is itself locked in position using a turret coupling between the nose piece and the tool. The turret coupling is comprised of a sleeve that fits closely on the lower end of a nose-piece adapter on the tool, or the tool itself, and that has notches in the rim of the sleeve. A retainer, which is secured to the nose-piece adapter or the tool itself, holds the sleeve in place but allows the sleeve to rotate relative to the tool. The nose piece or other suitable means for securing the tool to the workpiece is then tightly secured to the sleeve.

A latching mechanism on the tool places a latch key into a notch in the rim of the sleeve to lock the tool in position relative to the nose piece. A latch shaft secured to the latch key is provided to lift the key free of the rims to rotate the tool on the axis of the sleeve to a desired position. Then the shaft is manually actuated to replace the key in a notch by suitable means, preferably comprising a lever pivoted on a pin secured to the tool, one end of the lever engaging the shaft, and the other end being biased by a spring in a latching position. When the other end is manually depressed, the lever lifts the shaft to lift the key out of a notch. When the other end is released, the spring actuates the lever to lower the shaft. If the key should land on the sleeve rim between notches, it is a simple matter to adjust the position of the tool relative to the nose piece clockwise or counterclockwise until the key drops in a notch. The pin (fulcrum) is at a position between the ends of the lever selected to provide adequate positive force against the key by the spring to assure that it seats in a notch, and remains seated during operation of the tool.

The novel features that are considered characteristic of this invention are set forth with particularity in the appended claims. The invention will best be understood from the following description when read in connection with the accompanying drawings.

DESCRIPTION OF THE PREFERRED EMBODIMENT

Figure 1:
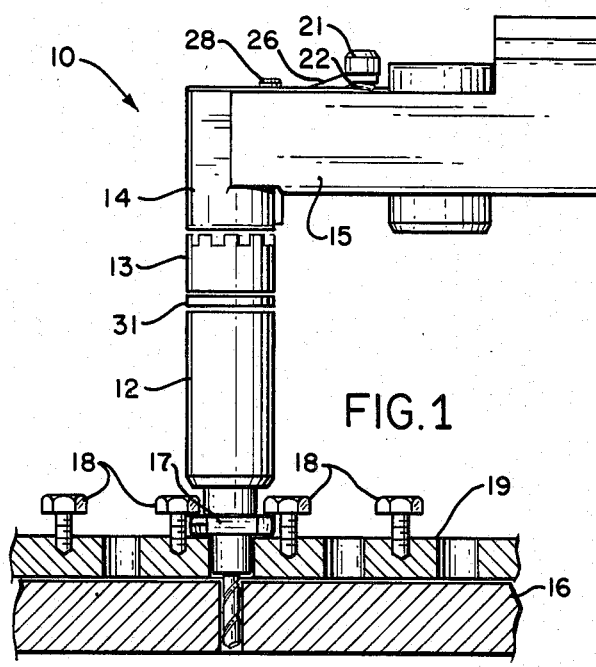
FIG. 1 illustrates a positive feed drill and drive gear train assembly locked by a clocking device in a desired position relative to a nose piece secured to a fixture clamped on a workpiece.

Referring to FIG. 1, a positive feed drill 10 is shown secured to a nose piece 12 by a turret coupling 13 of a clocking device between a housing 14 for the drive gear, feed gear and spindle assembly. A motor (not shown) is attached to a housing 15 for a gear train assembly, as shown in U.S. application Ser. No. 240,785.

The axis of the nose piece 12, turret coupling 13 and spindle in the housing 14 is perpendicular to the longitudinal axis of the gear train housing 15, and the axis of the motor (not shown) on the right may be in line with the axis of the longitudinal axis of the gear train housing 15, or perpendicular thereto, i.e., parallel to the spindle axis but at the end of the gear train housing 15 opposite the nose piece 12. However, that is a matter of choice or convenience; in either case the motor is offset to the right in FIG. 1 from the nose piece 12.

Figure 2:
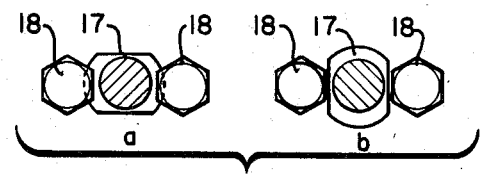
FIG. 2a is a view taken on a line 2—2 in FIG. 1 showing how the nose piece is secured to the fixture.
FIG. 2b is the same view with the nose piece rotated through 90° to unsecure the nose piece.
Figure 3:
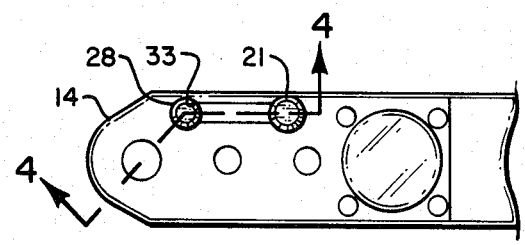
FIG. 3 is a top view of the positive feed drill shown in FIG. 1.

The nose piece 12 is secured to a workpiece 16 by a flange 17 that is essentially a disk that is of a radius sufficient to fit under heads of bolts 18 on opposite sides of a hole in a fixture 19 as shown in FIG. 2a, but flat on two sides so that by rotating the nose piece clockwise to the position shown in FIG. 2b, the nose piece may be lifted out from between the bolts. When rotated counterclockwise from the position shown in FIG. 2b to the position shown in FIG. 2a, the nose piece is locked in place. This is because the flange 17 is wedge shaped so that as the nose piece is turned counterclockwise on its axis, the top surface of the flange presses against the bolt heads to wedge the bottom surface of the flange against the fixture 19. The spindle is driven clockwise to cause a bit 20 to drill the desired hole in the workpiece 16. Note that the fixture 19 has many holes, each with bolts 18 on opposite sides for securing the nose piece in a place for each hole to be drilled through the workpiece.

Other arrangements may be provided for securing the nose piece 12 to the fixture 19, but all will have one thing in common: The nose piece must sometimes be locked in place with an orientation that does not allow the gear train housing and motor to be accommodated, such as when drilling on the aircraft wing very near the fuselage. In those situations, it is necessary to rotate the spindle housing 14, with gear train housing 15 affixed thereto, relative to the nose piece 12. This is accomplished by the turretcoupling 13 between the nose piece 12 and spindle housing 14. When a button 21 is pushed downwardly against a spring 22, the spindle housing 14 is unlatched from the turret coupling 13 so that it may be rotated to a new position.

Figure 4A:
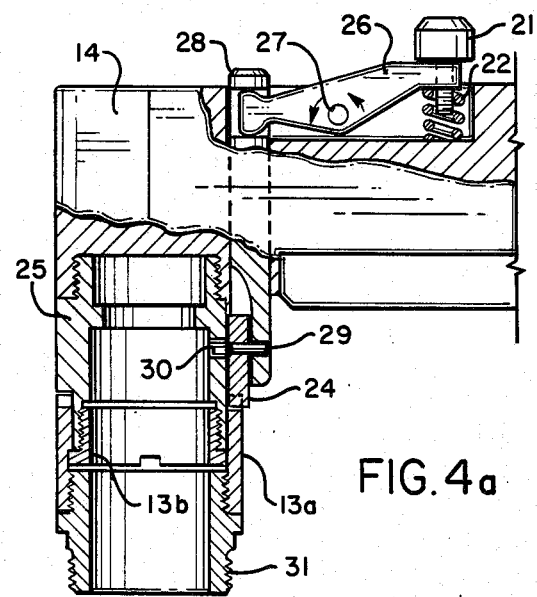
FIG. 4a is a view in elevation of the positive feed drill of FIG. 1 partially in section along a line 4—4 in FIG. 3 to facilitate showing the essential parts of the clocking device which constitutes the present invention in its locked position.
Figure 4B:
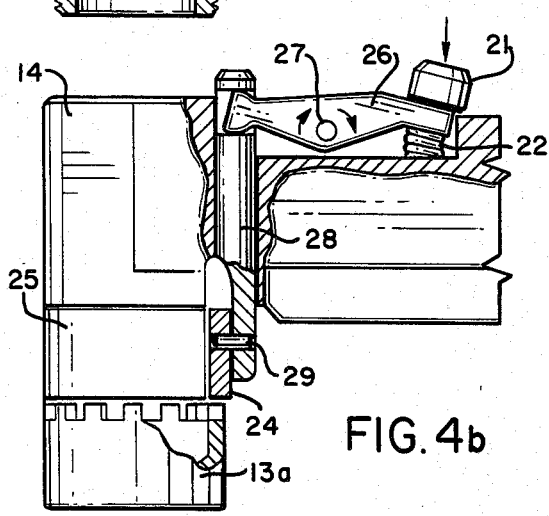
FIG. 4b is the same view with the clocking device in its unlocked position for reorienting the tool relative to the nose piece.

The latching mechanism, which will now be described with reference to FIGS. 4a and 4b, is brought into engagement with one of many notches in the rim of a turret sleeve 13a by a latch key 24. The views shown in FIGS. 4a and 4b are partially in sectin along line 4—4 to facilitate showing essential parts of the clocking device.

The turret coupling 13 is comprised of the sleeve 13a that fits over the lower end of a nose adapter 25 threaded into the spindle housing 14. A retainer 13b fits inside the sleeve 13a, and is threaded into the nose adapter 25. (Note that the retainer has two diametrically opposite notches on the lower rim thereof for a tool, such as a wide screw driver, to tighten the retainer in place.) The retainer has a lower large diameter portion which functions as a shoulder that supports an upper small diameter portion of the sleeve 13a so that, once threaded into the nose adapter 25 with the sleeve in place over the lower end of the nose adapter, the sleeve 13a may rotate freely on the nose adapter 25, but only while the latch key 24 is lifted up out of a notch in the rim of the sleeve 13a while pushing the button 21 down against the spring 22 as shown in FIG. 4b. A lever 26 pivoted on a pin 27 lifts a shaft 28 to which the latch key 24 is affixed by a pin 29. This pin is inserted after the turret coupling 13 has been assembled. A hole 30 in the nose adapter 25 permits the pin 29 to be knocked out for disassembly of the turret coupling 13. A second nose adapter 31 is screwed into the sleeve 13a.

Once the latching key 24 has been lifted clear of the notches on the rim of the sleeve 13a, the first nose adapter 25, and the positive feed drill attached to it, may turn freely on the sleeve 13a affixed to the second nose adapter 31, and nose piece 12. Consequently, the clock position of the positive feed drill 10 may be readily adjusted relative to the nose piece 12, either after it has been locked in place on the fixture 19, or before, or the positive feed drill 10 may be held stationary in space while the nose piece is turned on its axis, first to fit it between bolts on the fixture, and then to lock it in place against the fixture. In either case, releasing the button 21 will allow the spring 22 to pivot the lever 26 counterclockwise (as viewed in FIG. 4a) to return the shaft 28 back to the position shown with the key 24 in a notch on the rim of the sleeve 13a. It may be necessary to rotate the positive feed drill 10 clockwise or counterclockwise slightly in order for the key to fall into a notch, but the angular orientation of the positive feed drill is not expected to ever be so critical as to have a problem in that final adjustment of position to latch the turret coupling. Once latched, the positive feed drill can be operated to drill the hole.

The positive feed drill is often provided with automatic retractrion means, but if not a manual retraction operation of the drill will cause the bit to be retracted for quick repositioning of the drill on the fixture 19 for the next hole to be drilled. The wedge type of lock for the nose piece on the fixture and the clocking device will greatly facilitate moving the positive feed drill from one position to another.

Figure 5:
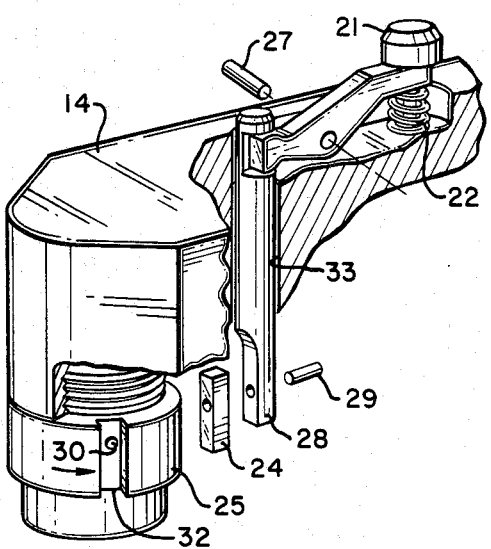
FIG. 5 is an exploded view of the clocking device for the tool.

The assembly of the clocking device will best be understood from the following description with reference to FIG. 5. The first nose adapter 25 is threaded into the spindle housing until a slot 32 with a hole 30 has been turned clockwise to the proper position to receive the latching key 24. (The threads are cut such that the nose adapter 25 has been tightly sealed when that position is reached.) The latch shaft 28 is then inserted into a hole 33 through the spindle housing 14. The lever 26, with the button 21 threaded through a hole at one end of the lever, is then positioned to receive the pivot pin 27, but first the coiled spring 22 is positioned under the button 21. The portion of the button that is threaded through the hole in the lever will hold the coiled spring in place. Next the latch key 24 is slipped into the slot 32 and the pin 29 is forced into aligned holes in the shaft 28 and the latch key 24. The turret coupling 13 is then assembled by slipping the sleeve 13a over the lower, small-diameter end of the nose adapter 25, and the retainer 13b is threaded into the nose adapter 25 as described hereinbefore. Finally a second nose adapter 31 is threaded into the sleeve. This second nose adapter is not a part of the turret coupling, but is instead an adapter that is made suitable for securing the nose piece 12 to the work piece 18, the configuration of which will depend upon the configuration of the fixture 19.

While the preferred embodiment disclosed is for a positive feed drill, it may be for any tool, and the turret coupling may be fitted over the lower end of the tool itself, rather than the lower end of an adapter secured to the tool. The sleeve of the turret coupling fitted closely on the end of the adapter, or tool, may be an inside or outside sleeve with a retainer outside or inside the sleeve secured to the adapter or tool. Still other modifications and equivalents may readily occur to those skilled in this art. Consequently, it is intended that the claims be interpreted to cover such modifications and equivalents.

What is claimed is:

1. A tool that requires angular orientation about an axis perpendicular to a workpiece, where said tool is locked in a desired position relative to a nose piece secured to the workpiece, an adapter to receive a nose piece or similar device or a turret coupling between said nose piece and an adapter to receive a nose piece or similar device or said tool, said turret coupling being comprised of a sleeve fitting closely on the lower end of said adapter or tool, a retainer to hold said sleeve in place while allowing said sleeve to rotate relative to said tool, said means for securing said tool to said workpiece affixed to said sleeve, and a latching mechanism for locking said sleeve in position relative to said tool comprised of notches distributed on the rim of said sleeve which is fitted closely on said adapter or tool, a latch key which fits into any one of the slots distributed on the rim of said sleeve, a shaft for lifting said key out of a notch and clear of said rim, and spring biased means for actuating said shaft to lift said key when manually operated, said means having a spring exerting sufficient force to reinsert said key in a notch when released.

2. A turret coupling as defined in claim 1 wherein said actuating means is comprised of a lever pivoted on a pin affixed to said tool, one end of said lever being connected to said shaft and the other end being connected to said spring.

3. A turret coupling as defined in claim 1 or 2 wherein said shaft passes through a passage in said tool to a top side thereof opposite to said turret coupling, and said pivot pin is affixed to said tool at or near said top side, with the spring biased end of said lever extending above said top side sufficiently to allow said lever to be pivoted enough to lift said key out of a notch in said rim.

4. A turret coupling as defined in claim 3 including a guide slot in said adapter or said tool, and wherein said key is of a length relative to the depth of said notches in the rim of said sleeve that said key will have a portion thereof in said guide slot while said key is seated in a notch.

* * * * *